United States Patent
Monty-Bromer et al.

(10) Patent No.: US 11,674,885 B2
(45) Date of Patent: Jun. 13, 2023

(54) APPARATUS AND METHODS TO DETECT AND ASSESS MICROORGANISM INFLUENCED CORROSION AND PITTING CORROSION

(71) Applicants: Chelsea Monty-Bromer, Copley, OH (US); John Senko, Akron, OH (US); Anwar Sadek, Akron, OH (US); Sai Prasanna Chinthala, Akron, OH (US)

(72) Inventors: Chelsea Monty-Bromer, Copley, OH (US); John Senko, Akron, OH (US); Anwar Sadek, Akron, OH (US); Sai Prasanna Chinthala, Akron, OH (US)

(73) Assignee: The University of Akron, Akron, OH (US)

( * ) Notice: Subject to any disclaimer, the term of this patent is extended or adjusted under 35 U.S.C. 154(b) by 207 days.

(21) Appl. No.: 17/071,406

(22) Filed: Oct. 15, 2020

(65) Prior Publication Data

US 2021/0109011 A1 Apr. 15, 2021

Related U.S. Application Data

(60) Provisional application No. 62/915,131, filed on Oct. 15, 2019.

(51) Int. Cl.
*G01N 17/02* (2006.01)
*G06F 17/18* (2006.01)

(52) U.S. Cl.
CPC ............. *G01N 17/02* (2013.01); *G06F 17/18* (2013.01)

(58) Field of Classification Search
CPC ................................ G01N 17/02; G06F 17/18
See application file for complete search history.

(56) References Cited

U.S. PATENT DOCUMENTS

| 4,789,434 A * | 12/1988 | Little | G01N 17/02 204/404 |
| 2003/0146749 A1* | 8/2003 | Srinivasan | G01N 17/02 324/71.2 |
| 2007/0017822 A1* | 1/2007 | Gill | G01N 17/02 205/775.5 |

(Continued)

OTHER PUBLICATIONS

Miller et al. Use of an electrochemical split cell technique to evaluate the influence of Shewanella oneidensis activities on corrosion of carbon steel, Pios one, 2016, DOI:10.1371/journal.pone. 0147899 (Year: 2016).*

(Continued)

*Primary Examiner* — Joshua L Allen
*Assistant Examiner* — Shizhi Qian
(74) *Attorney, Agent, or Firm* — Renner Kenner Greive Bobak Taylor & Weber

(57) ABSTRACT

A method to detect and assess microorganism influenced corrosion includes measuring current flow between a test electrode and a control electrode in a split chamber zero resistance ammeter apparatus and calculating a predictive difference in mass loss between the test electrode and the control electrode based on that current over time; and measuring the resistance, $R_{pit}$, of a surface of the subject metal to assess pitting corrosion using an electrochemical impedance spectroscopy apparatus.

7 Claims, 4 Drawing Sheets

(56) References Cited

U.S. PATENT DOCUMENTS

2008/0283418 A1* 11/2008 Jovancicevic ......... G01N 17/02
                                                        205/775.5
2015/0268152 A1*  9/2015 Friedersdorf ......... G01N 27/02
                                                        73/25.01

OTHER PUBLICATIONS

Bryant M.G., Fretting-crevice corrosion of cemented metal on metal total hip replacements, Ph.D. Thesis of the University of Leeds, 2013 (Year: 2013).*

Neeley A., Characterizing the localized corrosion of AA7075-T6 and AA2024-T3 by optical profilometry, Master thesis of the Ohio State University, 2012 (Year: 2012).*

Gamry reference 600: Potentiostat/Galvanostat/ZRA, downloaded from the following website: www.nanopolitan.com/Lab/Files/Equipment/Gamry/Gamry_Reference600_Specifications.pdf (Year: 2019).*

Kramer et al. Evaluation of corrosion resistance of aluminum-based alloys in bioethanol produced in Misiones, Procedia Materials Science 9 (2015) 341-349 (Year: 2015).*

* cited by examiner

| Organism | Uniform Corrosion | Pitting Corrosion |
| --- | --- | --- |
| *Byssochlamys* sp. SW2 | High | High |
| *Wickerhammomyces* sp. SE3 | Low | Low |
| *Y. lipolytica* | High | High |
| Consortium | Moderate | Moderate |
| Sterile | Low | Low |

Fig. 2

| Inoculum | Electrode | Actual Δm (mg) | Predicted Δm (mg) | Accuracy (%) | Pitting Density (pits/mm$^2$) |
|---|---|---|---|---|---|
| Sterile | WE1 | 13.8 | 3.9 | 78 | 14.9 |
| | WE2 | 10.9 | | | 12.5 |
| Byssochlamys sp. SW2 | WE1 | 29.85 | 29.58 | 63 | 41.86 |
| | WE2 | 11.15 | | | 15.92 |
| Y. lipolytica | WE1 | 38.84 | 29.68 | 62 | 45.22 |
| | WE2 | 18.43 | | | 16.88 |
| Wickerhammomyces sp. SE3 | WE1 | 17.07 | 4.46 | 74 | 21.18 |
| | WE2 | 13.9 | | | 14.76 |
| Byssochlamys and Wickerhammomyces | WE1 | 25.3 | 12.71 | 70 | 29.51 |
| | WE2 | 16.15 | | | 15.45 |

Fig. 4

APPARATUS AND METHODS TO DETECT AND ASSESS MICROORGANISM INFLUENCED CORROSION AND PITTING CORROSION

FIELD OF THE INVENTION

The present invention resides in the art of corrosion assessment. The present invention provides apparatus and methods to assess microbially influenced corrosion of a subject metal. In particular embodiments, the apparatus and methods are used to assess microbially influenced corrosion in various fluid handling and storage systems (e.g., piplines, storage tanks), using field samples from those systems, in order to quickly assess the potential for uniform and/or pitting corrosion due to microbial growth.

BACKGROUND OF THE INVENTION

There is a need in the art to identify when microbial growth is causing corrosion in order to develop effective mitigation strategies.

In the US, there are over 300,000 miles of natural gas and oil transmission pipelines. Approximately 3,400 miles of new pipelines were constructed from 2015-2017 with continued growth expected over the next decade. Microbially influenced corrosion (MIC) accounts for approximately 50% of corrosion damage in oil and gas pipelines. The average annual corrosion-related cost is estimated at $7 billion to monitor, replace, and maintain the pipelines and storage facilities. MIC is localized corrosion that is a consequence of the presence/activity of microorganisms on the metal surface. Pipeline accidents caused by MIC lead to loss of productivity, increased down time, property damage, injury to personnel, and environmental damage.

The biggest challenge when trying to identify MIC is making the connection between the microorganisms present in the system and the corrosion experienced. Microorganisms are present in nearly every oil and gas production environment, especially pipelines. However, microorganisms may be present and yet not be the cause of pipeline corrosion, as there are many factors that influence corrosion. Additionally, different corrosion mechanisms can result in similar corrosion morphology, making it difficult to draw conclusions as to the particular effect of the microorganisms.

Currently, biocides are used when there is any evidence of microorganism growth—even when there has been no empirical determination that microorganism growth is responsible for the corrosion. In instances where the microorganism is not responsible for corrosion, the application of the biocide is an unacceptable waste of resources. In some cases, biocides have also been shown to accelerate corrosion as some of these biocides can act as food source for microorganisms.

Currently available techniques only evaluate for the presence of certain types of microorganisms which have been previously shown to cause corrosion. However, only 1% of the microorganisms have been cultivated and well characterized physiologically and it is possible that this uncultivated majority may cause unknown corrosion processes. Additionally, it is often difficult to gain access to the inside of the pipeline and therefore sampling may rely heavily on quantification of microorganisms in the fluid flowing in the pipeline at various points in the pipeline, without a particular analysis of what is occurring at the metal surface that is being affected.

The present invention provides apparatus and methods that will serve the art by providing means to assess MIC and guide treatment methodologies for corrosive systems.

SUMMARY OF THE INVENTION

An embodiment of the present invention provides a method to detect and assess microbially influenced corrosion of a subject metal in contact with a corrosive medium including a subject microorganism or subject microorganism consortium, the method including measuring current flow between a test electrode and a control electrode in a split chamber zero resistance ammeter (SC-ZRA) apparatus. The SC-ZRA apparatus includes: a test chamber holding a test sample of the corrosive medium and the subject microorganism or subject microorganism consortium, wherein the test electrode is in contact with the test sample and wherein the test electrode is made of the subject metal and is subject to corrosion from contact with the test sample; a control chamber holding a control sample of the corrosive material, the control chamber being sterilized against the presence of the subject microorganism or subject microorganism consortium, wherein the control electrode is in contact with the control sample and wherein the control electrode is made of the subject metal and is subject to corrosion from contact with the control sample; an ionic connection between the test sample and the control sample to allow ion flow; and a zero resistance ammeter connected between the test electrode and the control electrode, the ammeter serving to measure current flow per said step of measuring. The method further includes, calculating a predictive difference in mass loss between the test electrode and the control electrode using the following formula:

$$\Delta m = \frac{sM \int I dt}{nF}$$

where $\Delta m$ is the difference in mass loss between the test electrode and the control electrode, $s$ is the stoichiometric coefficient of the subject metal in the anodic half reaction occurring in the test chamber, $M$ is the molecular weight of the test electrode, $I$ is the total current in amps as measured in step (a), and $t$ is time, and $n$ is the number of electrons, and $F$ is Faraday's constant, 96.485 Coulombs/mol.

Another embodiment of the present invention provides a method as in any embodiment above, further comprising converting $\Delta m$ to a corrosion rate estimating thickness loss over time.

Another embodiment of the present invention provides a method as in any embodiment above, further comprising treating the system with a biocide to address microorganism influenced corrosion.

Another embodiment of the present invention provides a method as in any embodiment above, further comprising converting the corrosion rate to a rating system of corrosion resistance for the subject metal.

Another embodiment of the present invention provides a method as in any embodiment above, further comprising the steps of: measuring the resistance, $R_{pit}$, of a surface of the subject metal that is undergoing pitting corrosion, using an electrochemical impedance spectroscopy apparatus; and correlating $R_{pit}$ to a pitting density to assess the extent of pitting corrosion.

Another embodiment of the present invention provides a method as in any embodiment above, wherein the split chamber zero resistance ammeter apparatus includes a reference electrode in the test sample of the test chamber, and the electrochemical impedance spectroscopy (EIS) apparatus includes the test chamber, the test electrode, the reference electrode, an EIS counter electrode, and an EIS-capable potentiostat that also serves as the zero resistance ammeter.

Another embodiment of the present invention provides a method as in any embodiment above, further comprising the steps of: defining pitting density as a function of $1/R_{pit}$ for the subject metal and using the function for the step of correlating $R_{pit}$ to a pitting density.

Another embodiment of the present invention provides a method as in any embodiment above, further comprising the steps of: defining when the accuracy of the $\Delta$m calculation is unacceptably inaccurate as a result of pitting of the subject metal.

Another embodiment of the present invention provides a method as in any embodiment above, further comprising the step of: correlating Rot with the accuracy of the $\Delta$m calculation.

Another embodiment of the present invention provides a method as in any embodiment above, wherein defining when the accuracy of the $\Delta$m calculation is unacceptably inaccurate includes defining the accuracy as a function of $R_{pit}$ and using the function for the step of correlating $R_{pit}$ with the accuracy of the $\Delta$m calculation.

Another embodiment of the present invention provides a method as in any embodiment above, where both the test sample and the control sample of the corrosive medium is sourced from a field sample taken from a corrosive system of interest.

Another embodiment of the present invention provides a method as in any embodiment above, wherein the control sample is sterilized to kill the subject microorganisms or subject microorganism consortium.

Another embodiment of this invention provides an apparatus for detecting microorganism influenced corrosion and pitting corrosion of a subject metal in contact with a corrosive medium including a subject microorganism or subject microorganism consortium, the apparatus comprising: a split chamber zero resistance ammeter apparatus configured to measure current flow between a test electrode and a control electrode, the apparatus comprising: a test chamber configured to hold a test sample of the corrosive medium and the subject microorganism or subject microorganism consortium such that the test electrode is in contact with the test sample, wherein the test electrode is made of the subject metal and is subject to corrosion from contact with the test sample; a control chamber configured to hold a control sample of the corrosive material that has been sterilized against the presence of the subject microorganism or subject microorganism consortium such that the control electrode is in contact with the control sample, wherein the control electrode is made of the subject metal and is subject to corrosion from contact with the control sample; an ionic connection between the test sample and the control sample to allow ion flow; and a zero resistance ammeter connected between the test electrode and the control electrode, the ammeter configured to measure current flow between the test electrode and the control electrode; an electrochemical impedance spectroscopy apparatus configured to measure the resistance, $R_{pit}$, of a surface of the subject metal that is undergoing pitting corrosion, the apparatus comprising: the test chamber; the test electrode; and an EIS-capable potentiostat that also serves as the zero resistance ammeter; and a processor communicating with the EIS-capable potentiostat and configured to: calculate a predictive difference in mass loss between the test electrode and the control electrode using the following formula:

$$\Delta m = \frac{sM \int Idt}{nF}$$

where $\Delta$m is the difference in mass loss between the test electrode and the control electrode, s is the stoichiometric coefficient of the subject metal in the anodic half reaction occurring in the test chamber, M is the molecular weight of the test electrode, I is the total current in amps as measured in step (a), and t is time, and n is the number of electrons, and F is Faraday's constant, 96.485 Coulombs/mol; and correlate $R_{pit}$ to a pitting density to assess the extent of pitting corrosion.

Another embodiment of the present invention provides an apparatus as above, wherein the processor is programed to assess pitting density as a function of $1/R_{pit}$ for the subject metal, and uses the function for correlating $R_{pit}$ to a pitting density.

BRIEF DESCRIPTION OF THE DRAWINGS

FIG. 2 is a table showing an exemplary rating system for uniform and pitting corrosion of carbon steel in the presence microorganisms used as examples.

FIG. 4 is a table comparing the measured and predicted mass loss and pitting density of carbon steel coupons in ZRA chambers.

DETAILED DESCRIPTION OF ILLUSTRATIVE EMBODIMENTS

The present invention provides apparatus and methods to detect and assess microbially influenced corrosion (MIC) of a subject metal in contact with a corrosive medium and a subject microorganism or subject microorganism consortium. The invention is applicable to virtually any system subject to corrosion, and serves to test the metal or metals employed in the systems as to their susceptibility to MIC and pitting corrosion. The corrosive systems, just for example, and without limitation, can include oil/gas pipelines, fuel/biofuel storage tanks and transport systems, waste water treatment systems, water system for heating and cooling, again, virtually any system having metals subject to corrosion.

Figure 1:
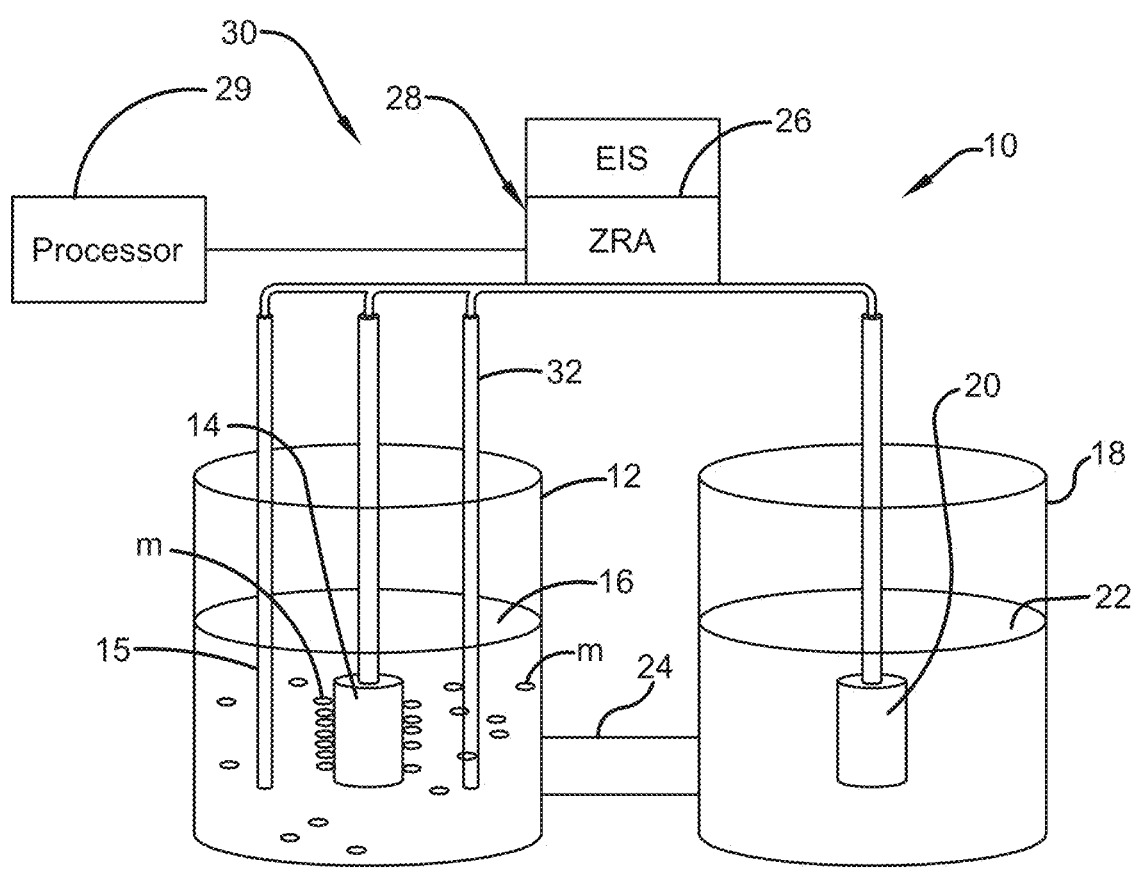
FIG. 1 is a schematic of the apparatus for detecting and assessing microbially influenced corrosion (MIC) of a subject metal.

With reference to FIG. 1, the apparatus includes a split chamber zero resistance ammeter (SC-ZRA) apparatus 10 having a test chamber 12 and a test electrode 14 and reference electrode 15 in the test chamber. The test electrode is made of the subject metal and is in contact with a test sample 16 of a corrosive medium under study. The corrosive medium also includes a subject microorganism or subject microorganism consortium m that may or may not cause microorganism influenced corrosion of the subject metal. The methods herein provide means to determine the potential for uniform and/or pitting corrosion of the subject metal due to microorganism presence and growth.

The test electrode 14 (i.e., the subject metal) can be any metal that is subject to corrosion, and will be chosen based on the desire to detect and assess MIC of that metal. In practical application, the subject metal is chosen to be the same as the metal used in a corrosive system under study. For example, if assessing an oil/gas pipeline for susceptibility to MIC, the subject metal is chosen to be the material forming the pipeline. The reference electrode 15 is standard and can be formed of materials such as calomel (saturated calomel) and silver-silver chloride.

The corrosive medium can be virtually any medium with an oxidant that oxidizes the subject metal. In some embodiments, the corrosive medium will be provided from field samples from the corrosive systems under study. In some embodiments, the corrosive medium will be developed to mimic field samples from the corrosive systems under study. For example, if assessing an oil/gas pipeline for susceptibility to MIC, the subject metal is chosen to be the material forming the pipes, and the corrosive medium is either obtained in the field from the contents of a section of pipe under study, or is created to mimic what is transported in the pipeline.

The apparatus 10 includes a control chamber 18 and a control electrode 20 in the control chamber. The control electrode 20 is made of the subject metal and is in contact with a control sample 22 of the corrosive medium under study. In some embodiments, the test electrode 14 and the control electrode 20 are the same size and chosen to be identical. The contents of the control chamber 18 are sterilized so as not to include the subject microorganism or subject microorganism consortium m that is present in the test chamber 12. In some embodiments, the control chamber 18 is devoid of any but a negligible amount of microorganisms. In some embodiments, the control sample 22 and the test sample 16 come from the same common source, such as a field sample, and the control sample 22 is sterilized so as to kill the subject microorganism or subject microorganisms consortium m existing in the field sample. This way the control and test conditions can be well established, with the sample being substantially identical but for the sterilization.

The corrosive systems targeted for this invention will be those having microbial growth. Such systems are not well known, with only about 1% of microorganisms having been cultivated and well characterized physiologically. The present invention provides means for assessing the potential for MIC in any corrosive system, even with one or more of the uncultivated majority of microorganisms. The terms "subject microorganism" and "subject microorganism consortium" are used to connote both the study of systems that might have a single type of microorganism and those that might have multiple types of microorganisms. In embodiments where the samples 16 and 22 of corrosive medium are sourced from a field sample, the real-world microbial conditions are inherently address, the control sample 22 being sterilized to create the necessary test and control.

The control sample 22 can be sterilized in any suitable way to sterilize the control sample 22 against the presence of the subject microorganism or subject microorganism consortium. Sterilization techniques include filtration and heat. To verify sterilization, laser microscopy and polymerase chain reaction tests can be performed on the sterilized solution to test for the presence of microorganisms.

An ionic connection is established between the test sample and the control sample to allow ion flow, in any of known ways, such as by salt bridge or an ion exchange membrane. In the embodiment shown, an ion exchange membrane 24 connects the test sample 16 of corrosive medium in the test chamber 12 to the control sample 22 of the corrosive medium in the control chamber 18 to allow ion flow. A zero resistance ammeter 26 is connected between the electrodes to measure current flow. In some embodiments, the ZRA 26 is provided as a capability of a potentiostat 28. Current flow between the test electrode 14 and the control electrode 20 is measured, over time, as the subject microorganism or microorganism consortium m grows. The test chamber 12 houses a corrosion medium with biotic and abiotic corrosion, while the control chamber 18 contains a corrosion medium with only abiotic corrosion, thus, as the microbes grow in the unsterilized chamber, electron flow across these chambers will indicate the corrosion rate due to microbial corrosion.

In some embodiments, measurements of current are taken periodically and mass loss caused by microbial growth is estimated according to Faraday's Law using the following formula:

$$\Delta m = \frac{sM \int I dt}{nF}$$

where $\Delta m$ is the difference in mass loss between the test electrode and the control electrode; n is the number of electrons transferred and s is the stoichiometric coefficient of the subject metal in the anodic half reaction occurring in the test chamber; M is the molecular weight of the test electrode subject metal; I is total current in amps; t is time in second; and F is Faraday's constant, 96.485 Coulombs/mol. A processor 29 can be used to record and analyze data and provide $\Delta m$.

In some embodiments, $\Delta m$ is used to calculate a mass loss rate for the test electrode (subject metal). Calculations in units of mils/year or mm/year can be converted to develop a system based on that of Fontana (M. G. Fontana, Corrosion Engineering, McGraw Hill, 3rd Ed. (1986):p:172) to rate the ability of an organism to cause uniform corrosion.

| Relative to Corrosion Resistance | Corrosion Rate | |
| --- | --- | --- |
| | mils per year | mm per year |
| Outstanding | <1 | <0.025 |
| Excellent | 1-5 | 0.025-0.1 |
| Good | 5-20 | 0.1-0.5 |
| Fair | 20-50 | 0.5-1.27 |
| Poor | 50-200 | 1.27-5.08 |
| Unacceptable | 200 ++ | 5.08 ++ |

In an exemplary rating system based on the experimental herein, organisms exhibiting "outstanding" or "excellent" corrosion resistance are labeled as "low", organisms exhibiting "good" corrosion resistance are labeled as "moderate", while organisms exhibiting "fair" or worse corrosion resistance are labeled as "high" for their ability to cause uniform microbial corrosion (FIG. 2) The corrosion rating for pitting corrosion is based on pitting as compared to a sterile control as no standard for pitting corrosion is available. Pitting corrosion is addressed below.

The above $\Delta m$ equation is found suitably accurate for predicting weight loss due to MIC when the test electrode is not experiencing significant pitting corrosion. As pitting corrosion grows, $\Delta m$ overestimates surface corrosion because of the mass loss effects of the pitting, and accuracy is lost. Thus, the present invention also provides for analysis of the test electrode to estimate pitting density and assess pitting corrosion. Though the calculation of Δm might be less accurate as pitting density increases, knowing that pitting corrosion is occurring provides useful data for proper treatment. In instances where the ZRA methodology shows MIC, a treatment method of this invention includes applying an appropriate biocide to the corrosive system showing MIC. Notably, there will be systems studied in which MIC does not occur, and operators will beneficially know that a biocide is not needed and would be wasteful in such systems.

The apparatus includes an electrochemical impedance spectroscopy (EIS) apparatus 30, that, though in some embodiments can be provided as an apparatus separate from the SC-ZRA apparatus 10, is in some embodiments, as shown, here combined with the SC-ZRA apparatus. The EIS apparatus 30 has a test chamber, a test electrode, and a reference electrode, which here are the same test chamber 12, test electrode 14, and reference electrode 15 of the SC-ZRA apparatus 10. A counter electrode 32 is provided as part of the EIS apparatus. The counter electrode is an inert electrode, typically, but not limited to a graphite rod or platinum rod.

The test chamber 12 obviously has the very contents previously described for the test chamber 12, and, if an EIS apparatus 30 is provided separately in practicing this invention, the contents of the EIS test chamber will be made to be the same as in the test chamber 12 of the SC-ZRA apparatus 10 so the EIS and SC-ZRA analyses will be made on the same system.

The test electrode 14, reference electrode 15, and counter electrode 32 connect to an EIS-capable potentiostat 28, which, as shown can be the same potentiostat 28 providing for the SC-ZRA analysis. [Perhaps this is ok, but perhaps you could better explain and use better and broader terminology to describe the equipment that could be used and how they can overlap and be provided by one potentiostat. The EIS apparatus will also communicate with processor 29. As known, EIS can be used to measure both the resistive and capacitive properties of materials by applying an AC potential to an electrochemical cell and measuring the current through the cell. EIS has been used to investigate biofilm development, biodeterioration of protective coatings, and pitting corrosion of metals.

Figure 3:
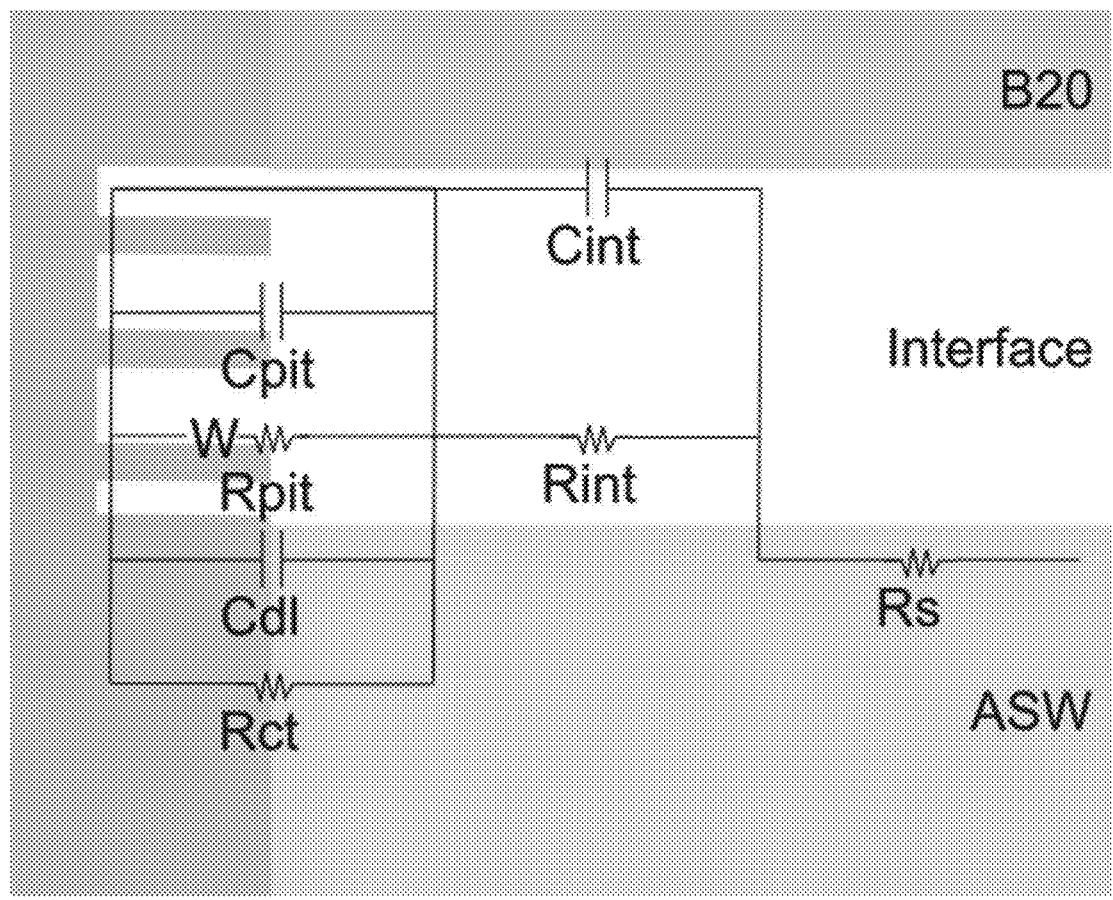
FIG. 3 is the equivalent circuit for EIS analysis.

In the EIS analysis, empirical impedance spectra are analyzed using the equivalent circuit shown in FIG. 3. The spectrum was derived as a combination of those proposed by Mansfield et al. to describe the impedance behavior of Al alloys undergoing pitting corrosion and Alvarez-Manzo et al. to describe the impedance behavior at a crude oil and water interface. F. Mansfeld, S. Lin, S. Kim, H. Shih, Pitting and passivation of Al alloys and Al-based metal matrix composites, J. Electrochem. Soc. 137 (1990) 78-82 and R. Álvarez-Manzo, J. Mendoza-Canales, S. Castillo-Cervantes, J Marín-Cruz, Studies on the Development of New Efficient Corrosion Inhibitors for Crude Oil Pipelines: Electrochemical Impedance Spectroscopy Results for 1, 8-Naphthyridines, J. Mex. Chem. Soc. 57 (2013) 30-35. In this equivalent circuit, $R_{ct}$ and $C_{dl}$ are the resistance and capacitance parameters for the metal surface, $R_{pit}$ and $C_{pit}$ are the corresponding parameters for the surface actively undergoing pitting corrosion. $R_{interface}$ and $C_{interface}$ are the resistance and capacitance at the oil and water interface and $R_s$ is the solution resistance between the reference electrode and the working electrode. W is a transmission line element observed at low frequencies.

$R_{pit}$ is obtained from the EIS analysis and used to assess pitting density and the accuracy of the estimate of surface corrosion provided by the SC-ZRA analysis. For a given test electrode, experimentally determined relationships are established between $R_{pit}$ and accuracy of the Δm calculation and between $R_{pit}$ and pitting density. Thus, measuring $R_{pit}$ through EIS can be correlated to a pitting density and show when pitting density has occurred to a point where the ZRA overestimates surface corrosion.

For a given test electrode/subject metal, EIS analysis coupled with observational techniques such as laser microscopy, scanning electron microscopy (SEM), surface profilometry and the like, can be used to create a functional relationship between $R_{pit}$ and pitting density for that metal. Under various conditions, $R_{pit}$ readings can be taken and then compared with an observation of the surface as to pitting density (e.g., pits/mm$^2$). With such relationship known and part of the data provided to the processor 29, an EIS analysis can be converted to a pitting density. Similarly, for a given test electrode/subject metal, EIS analysis coupled with an analysis of the accuracy of Δm calculations, can be used to understand when pitting corrosion is affecting the accuracy to an unacceptable degree (See Table 2 of FIG. 5). In some embodiments, a functional relationship between $R_{pit}$ and the accuracy of a SC-ZRA Δm calculation is created and such relationship is known and part of the data provided to the processor 29.

The processor is configured to receive ZRA and EIS data from the ammeter and potentiometer (in some embodiments a potentiometer provides both ZRA and EIS data) and calculate Δm and assess $R_{pit}$ for corrosion density and accuracy determinations.

In some embodiments, and particularly where the EIS and ZRA apparatus share components (test chamber, test electrode, reference electrode, potentiostat), the measuring of current by the ammeter and the measuring of $R_{pit}$ through EIS will be alternated over time. In some embodiments, the ammeter measurements are taken a least as often as 1 reading per 15 minutes and the EIS measurement of $R_{pit}$ is taken at least once every day.

EXAMPLES

Examples

To validate the corrosion detection approach, three microorganisms were tested for their ability to cause corrosion and the type of corrosion that they caused. These organisms were the fungus, *Byssochlamys* sp. SW2, and the yeasts, *Wickerhammomyces* sp. SE3 and *Yarrowia lipolytica*, all of which were isolated from corroding biodiesel storage tanks by Dr. Bradley Stevenson (University of Oklahoma) and Ms. Audra Crouch (US Air Force Research Lab) and colleagues. Detailed descriptions of experiments using the experiments illustrating the utility of ZRA and EIS are described in a doctoral dissertation by Dr. Robert B. Miller (Investigating Microbiologically Influenced Corrosion Using Zero Resistance Ammetry (ZRA) Technique in a Split-Cell Format. Doctor of Philosophy Dissertation, University of Akron, 2019, Integrated Bioscience), which is incorporated herein by reference. For ZRA incubations, carbon steel electrodes were immersed in separate chambers that contained an artificial sump water (ASW; with chemistry typical of a fuel storage tank) and biodiesel fuel. Charge balance between the chambers was allowed by an ion exchange membrane that connected the two chambers. Carbon steel coupons were immersed in each of the chambers, and current between the two coupons was measured using an ammeter. One chamber of the setup was inoculated with the above microorganisms, and when *Y. lipolytica* and *Byssochlamys* sp. SW2 were added current developed between the coupons, indicating corrosion. However, no current was observed in the incubations with *Wickerhammomyces* sp. SE3. When both *Wickerhammomyces* sp. SE3 and *Byssochlamys* sp. SW2 were added, current developed after *Byssochlamys* sp. SW2 grew, but was minimal during *Wickerhammomces* sp. SE3 growth. The coupons exposed to *Y. lipolytica* and *Byssochlamys* sp. SW2 were the most corroded. This observation illustrates the ability of the ZRA approach to discriminate between microbially induced corrosion and microbial growth. While all of the organisms grew in the incubations, the greatest loss of mass from the coupons was observed when current was induced.

At the end of the incubations, mass loss from the coupons was compared to the mass loss predicted by Faraday's Law:

$$\Delta m = \frac{sM \int I dt}{nF}$$

where $\Delta m$ is the difference in mass loss between the two coupons, s is the stoichiometric coefficient, M is the molecular weight of low alloy steel, I is total current in amps (FIG. 1), t is time in seconds, n is the number of electrons transferred, and F is Faraday's constant, 96.485 Coulombs/mol. In uninoculated incubations and incubations with *Wickerhammomyces* sp. SE3, current could predict mass loss with In the incubations where current was observed (the ones with *Y. lipolytica* and *Byssochlamys* sp. SW2), the current measured by ZRA could predict the amount of mass loss with 60% accuracy. This indicated that some current was occurring that was not reflected in mass loss from the coupons. These coupons (the ones exposed to *Y. lipolytica* and *Byssochlamys* sp. SW2) experienced the most pitting during the ZRA incubations. Therefore, we used electrochemical impedance spectroscopy (EIS) to evaluate how susceptible the carbon steel could be to pitting corrosion with the different organisms.

To test the hypothesis that pitting corrosion was causing the deviation from predicted mass loss from SC-ZRA incubations, a series of EIS experiments were conducted. The electrochemical impedance spectra were analyzed using the equivalent circuit shown in FIG. 3. The spectrum was derived as a combination of those proposed by Mansfield et al. to describe the impedance behavior of Al alloys undergoing pitting corrosion) and Alvarez-Manzo et al. (to describe the impedance behavior at a crude oil and water interface).

In this equivalent circuit, $R_{ct}$ and $C_{dl}$ are the resistance and capacitance parameters for the metal surface, $R_{pit}$ and $C_{pit}$ are the corresponding parameters for the surface actively undergoing pitting corrosion. $R_{interface}$ and $C_{interface}$ are the resistance and capacitance at the oil and water interface and $R_s$ is the solution resistance between the reference electrode and the working electrode. W is a transmission line element observed at low frequencies Nyquist (a) and Bode (b) plots were obtained from EIS experiments at the biodiesel-water interface of uninoculated and *Byssochlamys* sp. SW2-inoculated experiments after 0 and 30 days of incubation. EIS spectra obtained at day 0 for *Byssochlamys* sp. SW2 were taken after inoculation, resulting in a deviation from the uninoculated control.

The inverse of the pitting resistance at the metal surface $(1/R_{pit})$ gives an indication of the rate at which pitting will occur in a given incubation, with larger values resulting from enhanced pitting. We note that sterile incubations and incubations containing *Wickerhammomyces* sp. SE3 alone did not fit to the equivalent circuit in FIG. 3 (goodness of fit $\sim 2 \times 10^{-3}$); therefore, we assumed that negligible pitting was occurring in these incubations. This conclusion is consistent with observations in the SC-ZRA experiments and image analysis. This assumption was verified with microscopic characterizations of the metal surface, discussed below.

EIS predicted that *Y. lipolytica* and *Byssochlamys* sp. SW2 would induce the most pitting corrosion, while minimal pitting corrosion could be induced by *Wickerhammomyces* sp. SE3 or in the absence of microbial activities. Pitting factor is defined as the ratio of the depth of the five deepest pits divided by average penetration determined from mass loss. Additionally, *Y. lipolytica*, *Byssochlamys* sp. SW2, and the *Byssochlamys* sp. SW2 and *Wickerhammomyces* sp. SE3 consortium all have significantly higher pitting densities (pits/mm$^2$) than the sterile control.

The prediction of greater pitting by these organisms was confirmed by counting pits using 3D laser microscopy. Taken together, the results of these experiments illustrate the utility and reliability of using complementary ZRA and EIS to predict and detect two common forms of corrosion in fuel storage and handling structures. Comparing all incubations, there is a linear relationship between pitting density and the inverse pitting resistance with a goodness of fit of 0.92. These results indicate that the EIS technique can predict pitting corrosion (pitting density) for samples with pitting densities above approximately 18±3.4 pits/mm$^2$. This corresponds to data from SC-ZRA incubations that show a deviation in predicted mass loss when pitting density increases above 15 pits/mm$^2$.

Examinations of biodiesel storage tanks have revealed the co-occurrence of corrosion and microbiological blooms at water-fuel interfaces. Given the chemical changes induced by microbiological activities in these systems, a combination of the electrochemical techniques used here provide useful approaches to monitoring and detecting the extent of MIC. With these screening techniques, microorganisms present in tanks and other corrosive systems might be quickly screened and rated based on their ability to cause uniform and/or pitting corrosion. To that end, a system based on that of Fontana (see above) is here shown to rate the ability of an organism to cause uniform corrosion (FIG. 2). Organisms exhibiting "outstanding" or "excellent" corrosion resistance are labeled as "low", organisms exhibiting "good" corrosion resistance are labeled as "moderate", while organisms exhibiting "fair" or worse corrosion resistance are labeled as "high" for their ability to cause uniform microbial corrosion. The corrosion rating for pitting corrosion is based on pitting as compared to a sterile control as no standard for pitting corrosion is available. *Byssochlamys* sp. SW2 and *Y. lipolytica* are rated "high" for their ability to cause both uniform and pitting corrosion of carbon steel, while a consortium of *Byssochlamys* sp. SW2 and *Wickerhammomyces* sp. SE3 is rated "moderate".

Experimental

For the ZRA and EIS experiments, microorganisms, *Byssochlamys* sp. SW2, *Yarrowia lipolytica*, and *Wickerhammomyces* sp. SE3. were incubated in sterile artificial sump water (ASW), which consists of: 15 mg/L of NaCl, 35 mg/L NaF, 2 mg/L CaCl$_2$, 18 mg/L KNO$_3$, 10 mg/LNa$_2$SO$_4$, 15 mg/L (NH$_4$)$_2$SO$_4$, and 17 mg/L K$_2$HPO$_4$.

For SC-ZRA incubations, glass chambers were filled with 125 mL of filter-sterilized (0.2 μm) ASW and B20 biodiesel (referred to hereafter as B20). The chambers were connected with a cation exchange membrane. Polished and sterilized working electrodes (referred to as WE1 and WE2) were placed in the two cells, and a saturated calomel electrode (SCE) reference electrode was used in the WE1 chamber to measure potential. The WEs were placed at the water-fuel interface.

Current between WEs and potential were measured with electrodes configured so that a positive current represented electron transfer from WE1 to WE2. After the experiments were completed, steel coupons were analyzed for mass loss and pitting corrosion.

EIS experiments were conducted with 75 mL of fuel and 75 mL of ASW in a single chamber, and were also inoculated with the microorganisms. A carbon steel working electrode, a graphite rod counter electrode, and a reference electrode were all placed in the chamber. The sterile carbon steel electrode was placed at the middle of the B20-water interface.

Corrosion rates were determined by mass loss analysis method as described in ASTM method G01-03. Steel electrodes were prepared as described in ASTM G01-03 prior to surface characterization. Carbon steel electrode surface and pitting analysis was characterized using a Keyence VK-X250 three-dimensional (3D) laser microscope (Keyence Corp., Osaka, Japan), and data was analyzed using Keyence VK-X MultiFile analyzer software. Surface profiles were generated using the Keyence laser microscope at 10× objective magnification. Each surface profile generated 3D images with areas of approximately 1.56 mm2. Pits were determined by the software (VK-X250 multifile analyzer software) using a threshold of 10 μm. Pits were counted and normalized by dividing the total surface area examined.

What is claimed is:

1. A method to detect and assess microorganism influenced corrosion of a subject metal in contact with a corrosive medium including a subject microorganism or subject microorganism consortium, the method comprising the steps of:
   measuring a current flow between a test electrode and a control electrode in a split chamber zero resistance ammeter apparatus comprising:
      a test chamber holding a test sample of the corrosive medium and the subject microorganism or subject microorganism consortium, wherein the test electrode is in contact with the test sample and wherein the test electrode is made of the subject metal and is subject to corrosion from contact with the test sample;
      a control chamber holding a control sample of the corrosive medium, the control chamber being sterilized against the presence of the subject microorganism or subject microorganism consortium, wherein the control electrode is in contact with the control sample and wherein the control electrode is made of the subject metal and is subject to corrosion from contact with the control sample;
      an ionic connection between the test sample and the control sample to allow ion flow; and
      a zero resistance ammeter connected between the test electrode and the control electrode, the zero resistance ammeter serving to measure the current flow between the test electrode and the control electrode;
   measuring a pitting resistance, $R_{pit}$, of a surface of the subject metal that is undergoing uniform and pitting corrosion using an electrochemical impedance spectroscopy apparatus, the electrochemical impedance spectroscopy apparatus comprising:
      the test chamber,
      the test electrode, and
      an EIS-capable potentiostat that also serves as the zero resistance ammeter;
      a processor in communication with the EIS-capable potentiostat;
   wherein measuring the pitting resistance, $R_{pit}$, of the surface of the subject metal that is undergoing uniform and pitting corrosion includes:
      receiving, at the processor, empirical impedance spectra from the electrochemical impedance spectroscopy apparatus;
      modelling, using the processor, an equivalent circuit comprising a resistance, $R_{ct}$, and a capacitance, $C_{dl}$, for uniform corrosion at the surface of the subject metal, the pitting resistance, $R_{pit}$, and a pitting capacitance, $C_{pit}$, for pitting corrosion at a pit in the surface of the subject metal;
      measuring, using the processor, the pitting resistance, $R_{pit}$, using the received empirical impedance spectra and the equivalent circuit;
   calculating, using the processor, a predictive difference in mass loss between the test electrode and the control electrode using the following formula:

$$\Delta m = \frac{sM \int I dt}{nF}$$

where $\Delta m$ is the predictive difference in mass loss between the test electrode and the control electrode, s is a stoichiometric coefficient of the subject metal in an anodic half reaction occurring in the test chamber, M is a molecular weight of the test electrode, I is a total current in amps as measured in said step of measuring current flow, t is time, n is the number of electrons, and F is Faraday's constant, 96.485 Coulombs/mol; and
   evaluating, using the processor, whether the predictive difference in mass loss overestimates an amount of surface corrosion by comparing the inverse of the pitting resistance, $1/R_{pit}$, to a reference pitting density data.

2. The method of claim 1, further comprising converting $\Delta m$ to a corrosion rate estimating thickness loss over time.

3. The method of claim 2, further comprising converting the corrosion rate to a rating system of corrosion resistance for the subject metal.

4. The method of claim 1, where both the test sample and the control sample of the corrosive medium is sourced from a field sample taken from a corrosive system of interest.

5. The method of claim 4, further comprising treating the corrosive system of interest with a biocide to address microorganism influenced corrosion.

6. The method of claim 4, wherein the control sample is sterilized to kill the subject microorganisms or subject microorganism consortium.

7. An apparatus for detecting microorganism influenced corrosion and pitting corrosion of a subject metal in contact with a corrosive medium including a subject microorganism or subject microorganism consortium, the apparatus comprising:
- a split chamber zero resistance ammeter apparatus configured to measure a current flow between a test electrode and a control electrode, the split chamber zero resistance ammeter apparatus comprising:
  - a test chamber configured to hold a test sample of the corrosive medium and the subject microorganism or subject microorganism consortium such that the test electrode is in contact with the test sample, wherein the test electrode is made of the subject metal and is subject to corrosion from contact with the test sample,
  - a control chamber configured to hold a control sample of the corrosive medium that has been sterilized against the presence of the subject microorganism or subject microorganism consortium such that the control electrode is in contact with the control sample, wherein the control electrode is made of the subject metal and is subject to corrosion from contact with the control sample,
  - an ionic connection between the test sample and the control sample to allow ion flow, and
  - a zero resistance ammeter connected between the test electrode and the control electrode, the zero resistance ammeter configured to measure the current flow between the test electrode and the control electrode;
- an electrochemical impedance spectroscopy apparatus configured to measure a pitting resistance, $R_{pit}$, of a surface of the subject metal that is undergoing uniform and pitting corrosion, the electrochemical impedance spectroscopy apparatus comprising:
  - the test chamber,
  - the test electrode, and
  - an EIS-capable potentiostat that also serves as the zero resistance ammeter; and
- a processor communicating with the EIS-capable potentiostat and configured to:
  - calculate a predictive difference in mass loss between the test electrode and the control electrode using the following formula:

$$\Delta m = \frac{sM \int I dt}{nF}$$

where $\Delta m$ is the predictive difference in mass loss between the test electrode and the control electrode, s is a stoichiometric coefficient of the subject metal in an anodic half reaction occurring in the test chamber, M is a molecular weight of the test electrode, I is a total current in amps as measured using the zero resistance ammeter, t is time, n is a number of electrons, and F is Faraday's constant, 96.485 Coulombs/mol;
  - receive empirical impedance spectra from the electrochemical impedance spectroscopy apparatus;
  - model an equivalent circuit comprising a resistance, $R_{ct}$, and a capacitance, $C_{dl}$, for uniform corrosion at the surface of the subject metal, the pitting resistance, $R_{pit}$, and a pitting capacitance, $C_{pit}$, for pitting corrosion at a pit in the surface of the subject metal;
  - measure the pitting resistance, $R_{pit}$, using the received empirical impedance spectra and the equivalent circuit; and
  - evaluate whether the predictive difference in mass loss overestimates an amount of surface corrosion by comparing the inverse of the pitting resistance, $1/R_{pit}$, to a reference pitting density data.

* * * * *